United States Patent
Naccache et al.

Patent Number: 5,414,772
Date of Patent: May 9, 1995

[54] SYSTEM FOR IMPROVING THE DIGITAL SIGNATURE ALGORITHM

[75] Inventors: David Naccache, Maisons Alfort; David M'raihi, Marseille, both of France

[73] Assignee: Gemplus Development, Gemenos, France

[21] Appl. No.: 82,228

[22] Filed: Jun. 23, 1993

[51] Int. Cl.⁶ .............................. H04K 1/00
[52] U.S. Cl. ....................... 380/46; 380/30; 380/23; 235/382
[58] Field of Search .............. 380/23, 30, 46; 235/380, 382

[56] References Cited

U.S. PATENT DOCUMENTS

| | | |
|---|---|---|
| 5,016,274 | 5/1991 | Micali et al. ............... 380/23 |
| 5,297,206 | 3/1994 | Orton ........................ 380/30 |
| 5,299,263 | 3/1994 | Beller et al. ................ 380/30 |

*Primary Examiner*—David C. Cain
*Attorney, Agent, or Firm*—Nilles & Nilles

[57] ABSTRACT

A system comprises at least, two parts, connected to each other by the means of a common communication interface wherein a first communicating apparatus A, having data processing means, communication means, memory means and random or pseudo-random generation means relies of the computational power of a second communicating apparatus B having data processing means, communication means and memory means in order to compute the inverse of a first number x modulo a second number n and use the resulting modular inverse in an encryption, decrption, key exchange, identification or digital signature cryptographic protocol.

17 Claims, 4 Drawing Sheets

SYSTEM FOR IMPROVING THE DIGITAL SIGNATURE ALGORITHM

BACKGROUND OF THE INVENTION

1. Field of the Invention

The present invention relates to a system for improving the computational efficiency of protocols wherein modular inverses are to be computed by a slow apparatus connected by a communication link to a faster but potentially hostile device.

The invention can be used advantageously in order to speed-up the Digital Signature Algorithm (DSA), proposed by the US National Institute of Standards and Technology (A Proposed Federal Information Processing Standard for Digital Signature Standard (DSS), Federal Register Announcement, Aug. 30, 1991, p 42980–42982).

2. Discussion of the Related Art

Although file idea of inserting a chip into a plastic card is relatively old (The first patents are now seventeen years old), practical applications only emerged a few years ago because of some computational limitations of the cards. Progress in storage capacity, security and circuit technology (for example EEPROM) leads quickly to new generations of cards and more ambitious applications such as the new emerging US Digital Signature Standard.

The Digital Signature Algorithm (DSA, US patent application No. 07/738,431 entitled "Digital Signature Algorithm") was proposed by the US National Institute of Standards and Technology to provide an appropriate core for applications requiring a digital rather than written signature. The DSA digital signature is a pair of large numbers represented in a computer as strings of binary digits. The digital signature is computed using a set of rules (i.e. the DSA) and a set of parameters such that the identity of the signatory and integrity of the data can be verified. The DSA provides the capability to generate and verify signatures.

Signature generation makes use of a private key to generate a digital signature, Signature verification makes use of a public key which corresponds to, but is not the same as, the private key. Each user possesses a private and a public key pair. Public keys are assumed to be known to the public in general whereas private keys are never shared, Anyone can verify the signature of a user by employing that user's public key. Signature generation can be performed only by the user's private key.

DSA parameters are:

① A prime modulus p where $2^{L-1} < p < 2^L$ for $512 \leq L \leq 1024$ and $L = 64\ \alpha$ for some $\alpha$.

② A prime q such that $2^{159} < q < 2^{160}$ and p-1 is a multiple of q.

③ A number g, of order q modulo p such that $$g = h^{\frac{p-1}{q}} \mod p,$$

where h is any interger such that $1 < h < p - 1$ and $$g = h^{\frac{p-1}{q}} \mod p > 1.$$

④ A number x, generate randomly or pseudo randomly.

⑤ A number y defined by the relation: $y = g^x \mod p$.

⑥ A number k generated randomly or pseudo-randomly such that $0 < k < q$.

The integers p, q and g are system parameters and can be public and/or common to a group of users. The signer's private and public keys are respectively x and y. Parameters x and k are used for signature generation only and must be kept secret. Parameter k must be re-generated for each signature.

In order to sign a message m (hashed value of a primitive file M), the signer computes the signature {r, s} by:

$$r = (g^k \mod p)\mod q \text{ and } s = \frac{m + xr}{k} \mod q$$

Wherein division by k is done modulo q (that is, 1/k is the number k' such that k k' = 1 mod q).

For instance, if q=5 and k=3 then 1/k=2 since $3 \times 2 = 6 = 1 \mod 5$.

After checking that $r \neq 0 \neq s$, as explained the DSA description, the signature {r, s} is sent to the verifier who computes:

① $w = 1/S \mod q$
② $u_1 = m\ w \mod q$
③ $u_2 = r\ w \mod q$
④ $v = (g^{u_1} y^{u_2} \mod p) \mod q$
⑤ And checks if v and r match to accept or reject the signature.

SUMMARY OF THE INVENTION

In the original DSA, the computation of s involves the calculation of a modular inverse (1/k mod q), which is lengthy and cumbersome especially if the signing device is computationally weak (e.g. a smart-card). This particularity of the DSA is often cited as a handicap compared to other signature algorithms (e.g. RSA, Guillou-Quisquater or the Fiat-Shamir schemes which are respectively protected by patents 4,405,829, EP 0311470 A1 and EP 0325238 A2 and do not involve the computation of such inverses).

In systems where a modular exponentiator is available, the inverse of k may be computed by the exponentiation of k to the power q-2 modulo q but this solution suffers from the disadvantage of being too lengthy (several hundreds of modular multiplications). Otherwise, Euclidean inversion, involving long integer division is generally used.

In many (if not most) practical cases, the signer is a weak portable device with very limited RAM, ROM and EPROM or EEPP, OM capacities whilst the verifier of the signature is a (possibly off-line) much more powerful machine.

It is one object of the invention to disclose a general efficient system by the means of which an apparatus A (such as a smart-card, a badge or an electronic key) may rely upon the computational power of a (potentially hostile) device B (e.g. a personal computer, a vending machine or a physical access-control gate) in order to compute modular inverses. Accordingly, the invention concerns a system comprising, at least, two parts, connected to each other by the means of a common communication interface and wherein a first communicating apparatus A, having data processing means, communication recaps, memory means and random or pseudo-random generation means relies of the computational power of a second communicating apparatus B having data processing means, communication means and memory means in order to compute the inverse of a first number x modulo a second number n and use the resulting modular inverse in an encryption, decryption, key exchange, identification or digital signature cryptographic protocol.

It is a second object of the invention to disclose a method by the means of which the computation of many different modular inverses can be batched together by device B.

It is a third object of the invention to disclose a method for allowing an electronic signing device to compute fully compatible DSA signatures without performing modular inversions.

It is a further object of the invention to disclose a respective verification method for checking the validity of such signatures by an electronic verification device and a secure protocol for executing the inverse-less signature.

Finally, a last object of the invention is to disclose an apparatus implementing advantageously the inventive signature scheme in accordance with a respective verification device.

DETAILED DESCRIPTION OF THE PREFERRED EMBODIMENT OF THE INVENTION

Figure 1:
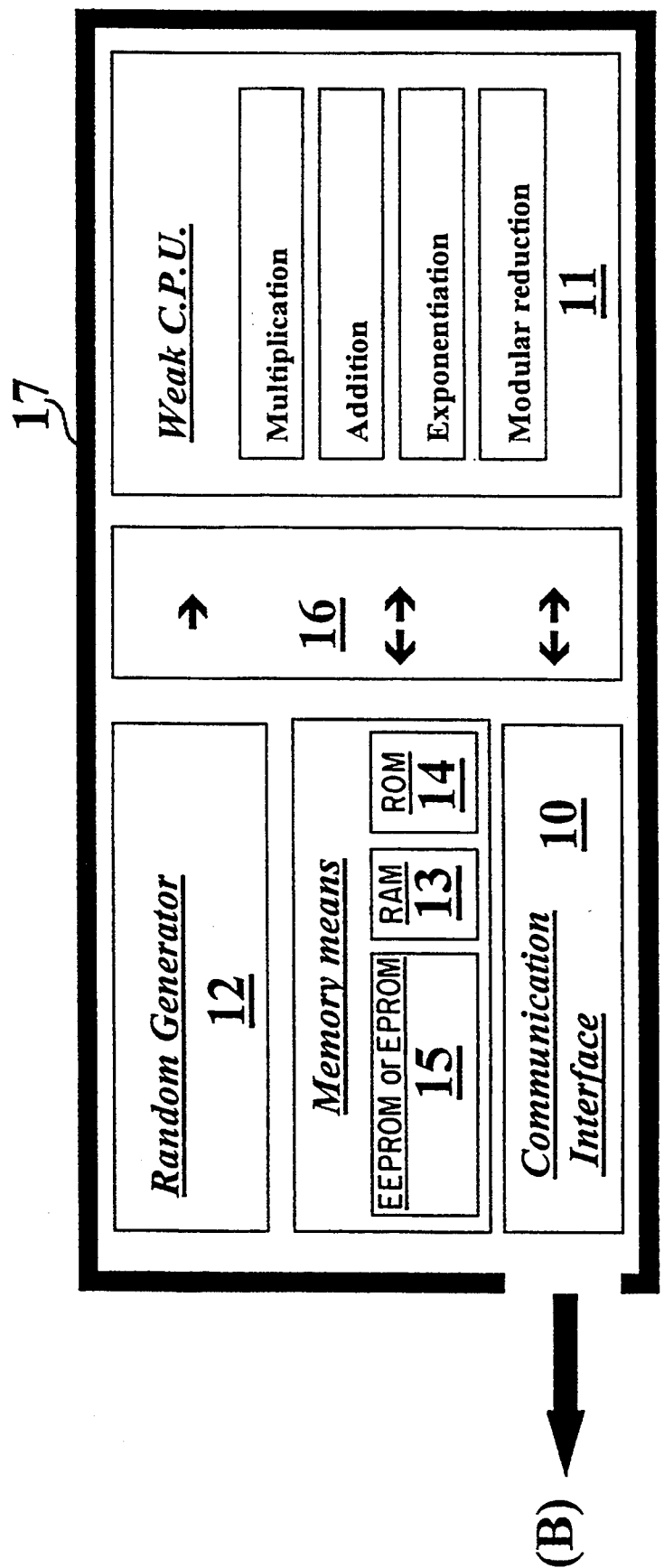
FIG. 1 depicts a block diagram of apparatus A according to the system of the present invention.

According to an invention, the apparatus A comprises a central processing unit (CPU) 11, a communication interface 10, a random or pseudo random number generator 12, a Random Access Memory (RAM) 13 and/or a Read Only Memory (ROM) 14 and/or an Electrically (possibly Erasable) Programmable Memory (EPROM or EEPROM) 15. Apparatus A may, for example, be a smart-card, a PCMIA card, a badge, a contactless card, or any other portable electric device.

The CPU and/or the ROM have stored therein programs or computational resources corresponding to or implementing an encryption, decryption, key exchange, identification or digital signature cryptographic protocol (e.g. the DSA signature generation rules and a hash function), multiplication, addition, exponentiation and modular reduction. Some of these operations can be merged together (for instance, the modular reduction can be integrated directly into the multiplication).

In the case of DSA implementation, the RAM typically have stored therein the file M on which the hash function and the DSA are applied successively. The EPROM (or EEPROM) 15 contains the values of parameters: p, q, g, x and k which are generated and used as explained in the following description, The CPU 11 pilots, via the data and address bus 16, the communication interface 10, the read and write operations in memories 13, 14, 15 and gets random numbers from the random number generator 12.

Apparatus A is protected from the outside world by physical protection means 17. This protection should be sufficient for preventing any unauthorised entity from gaining access to the secret key x. Today's most popular techniques for achieving this goal are the encapsulation of the chip into a security module and the providing of the chip with light, temperature, abnormal voltage and abnormal clock frequency detectors. Particular design considerations such as the scrambling of the memory mapping are commonly used as well.

According to the invention, apparatus B comprises at least: a central processing unit (CPU) 30 and memory means 32, 33 and 34. Apparatus B may be a personal computer, a vending machine, a physical access control gate, or the like. Interfaces 10 and 31 together form a common communication interface providing two-way communication between Apparatus A and Apparatus B.

The CPU 30 pilots, via the data and address bus 35, the communication interface 31, the read and write operations in memories 32, 33 and 34.

The CPU and/or the ROM of apparatus B have stored therein programs or computational resources corresponding to or implementing an encryption, deception, key exchange, identification or digital signature cryptographic protocol (e.g. the DSA verification rules and a hash function), multiplication, modular inversion, comparing, exponentiation and modular reduction. Some of these operations can be merged together (for instance, the modular reduction can be integrated into the multiplication).

Figure 2:
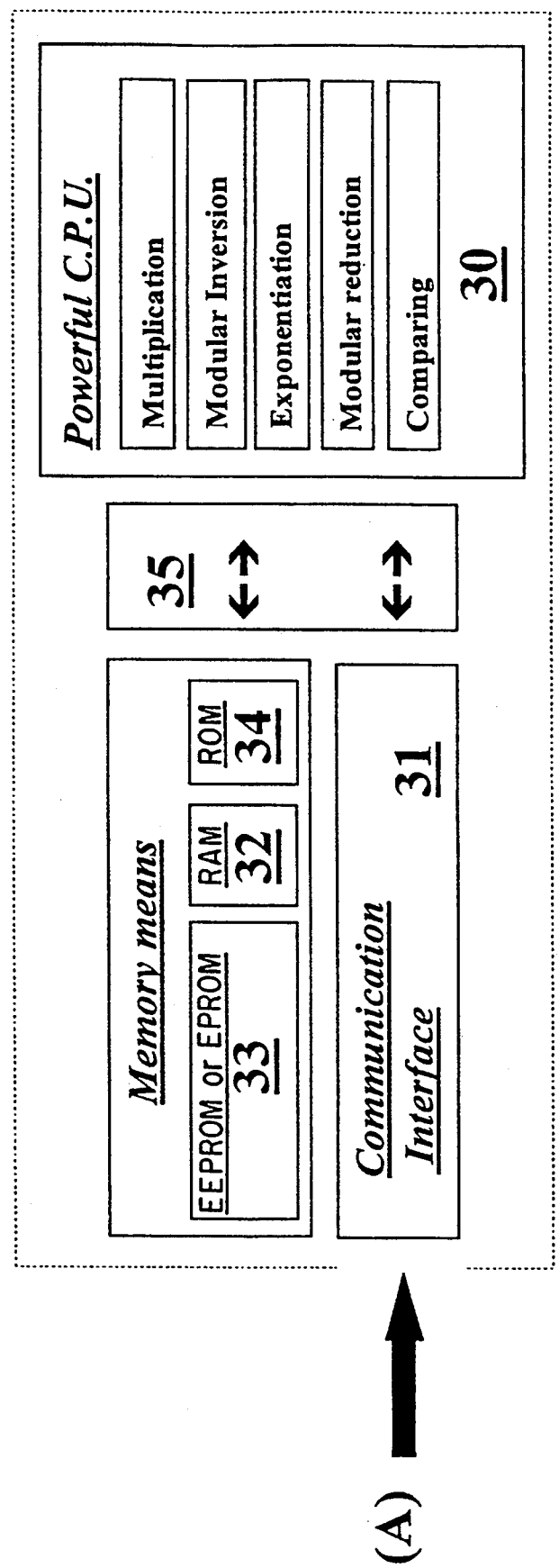
FIG. 2 depicts a block diagram of apparatus Is according to the system of the present invention.
Figure 3:
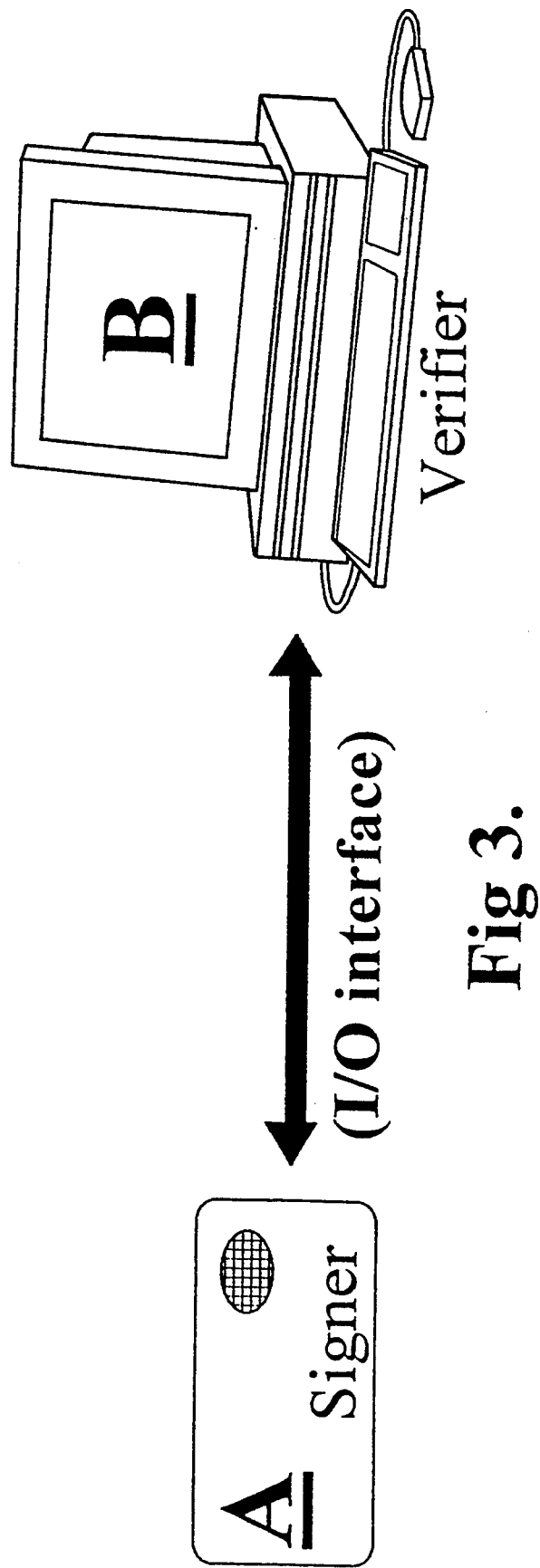
FIG. 3 represents a preferred embodiment of the invention wherein apparatus A is a chip card and apparatus B a computer or a microcomputer comprising a chip reader enabling physical communication with the card.
Figure 4:
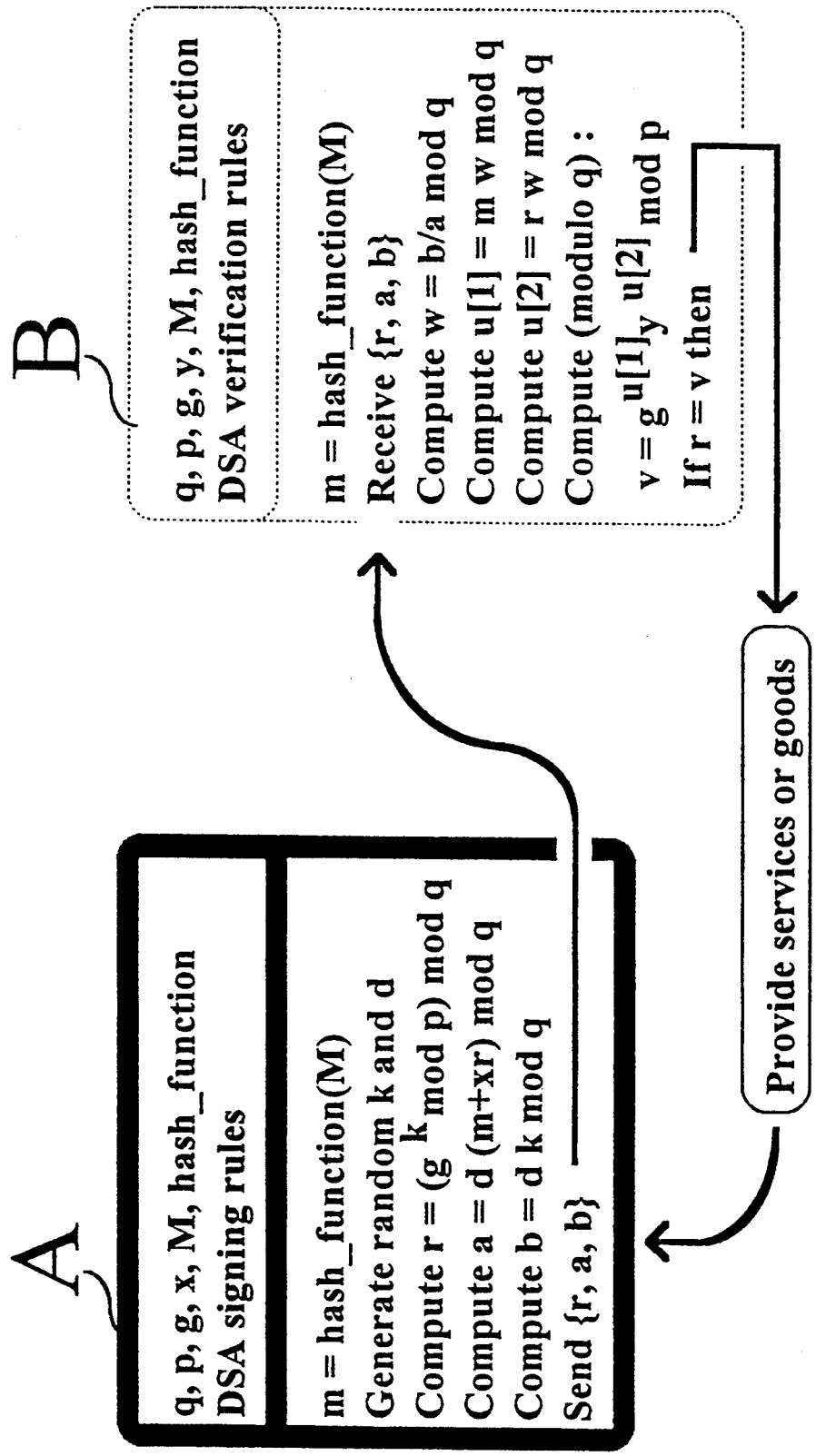
FIG. 4 is a flow diagram showing the steps of DSA operations improved by the system of the present invention.

In the general inventive system, the computation of the inverse of a number x modulo n is achieved by exchanging at least the following data, as represented on FIG. 4, between devices A and B represented on FIGS. 1 and 2:

a. Apparatus A picks, by its random number generation means 12, a random number d such that $1<d<n$ computes the number $y=d\ x \bmod n$, and sends the number to the apparatus B via the communication interface 10.

b. Apparatus B computes, by its processing means 30, a number z such that $z\ y = 1 \bmod n$ (that is, z is the inverse of y modulo n) and returns z to the apparatus A via the communication interface 31.

c. Apparatus A computes $w = z\ d \bmod n$ but accepts w as the modular inverse of x and writes it into its memory means (e.g. RAM 13) only if $x\ w \equiv 1 \bmod n$.

d. Apparatus A uses value w in the processing of information (e.g. signature generation or encryption of a message) before sending a signal to apparatus B or in reaching an internal decision concerning a signal coming from apparatus B (e.g. signature verification, decryption of a ciphertext).

Thus, according to the invention, apparatus A uses the so computed modular inverse w in an encryption, decryption, key exchange, identification or digital signature cryptographic protocol.

In case where $k \geq 2$ modular inverses are to be calculated, it is possible to batch these together by apparatus B as follows:

a. Apparatus A multiplies all the k numbers to be inverted $(x_1, \ldots x_k)$, which are stored in A's memory means (typically in RAM), by each other to get a number $$x = \pi_{i=1}^{k} x_i \bmod n$$

which it inverts by using the previously described protocol.

b. Knowing $x_1, \ldots, x_k$ and the inverse of the product $$\pi_{i=1}^{k} x_i \bmod n,$$

apparatus A computes the modular inverses of numbers $x_1, \ldots, x_k$ by inter multiplications and uses the so-computed modular inverses of $x_1, \ldots, x_k$ in an encryption, decryption, key exchange, identification or digital signature cryptographic protocol.

More particularly, when devices A and B execute a task requiring the sending by apparatus A, of a number s which is the modular ratio of two quantities a and b (that is, s=a/b rood n) wherein a and b are sensible information stored in the memory means of apparatus A (e.g. RAM or EEPROM) that should not be communicated in clear outside of apparatus A, the following protocol is carried out:

a. Apparatus A picks, by using the random or pseudo-random generation means 12, a random number d, such that <d<n and sends to the apparatus B the numbers u=d a mod n and v=d b mod n via the common communication interface.

b. Apparatus B computes the number s by s≡u/v rood n and uses the so computed number s in an encryption, decryption, key exchange, identification or digital signature cryptographic protocol, Applied to DSA, our inventive scheme yields a system in which system parameters and keys are the same as those of the DSA namely:

①  A prime modulus p where $2^{L-1} < p < 2^L$ for any sufficiently big L

②  A prime q such that $2^{159} < q < 2^{160}$ and p-I is a multiple of q.

③  A number g, of order q modulo p such that $$g = h^{\frac{p-1}{q}} \bmod p,$$

where h is any integer with 1<h<p-1 such that $$g = h^{\frac{p-1}{q}} \bmod p > 1.$$

④  A number x, generated randomly or pseudo randomly.

⑤  A number y defined by the relation: $y = g^x \bmod p$.

⑥  A number k generated randomly or pseudo randomly such that 0<k<q.

But wherein an additional random or pseudo random number d such that 0<d q is picked by the signer (apparatus A).

In order to sign a message m (hashed value of a primitive file M), the signer computes the expanded signature {r, a, b} by:

r=(g k mod p) mod q, a=d(m+x r) mod q and b=d k mod q

The expanded signature {r, a, b} is sent to the verifier who computes:

①  w=b/a mod q

And continues the signature verification exactly as in the original DSA:

②  $u_1$=m w mod q

③  $u_2$=r w mod q

④  v=($g^{u_1} y^{u_2}$ mod p) mod q)

⑤  And cheeks if v and r match to accept or reject the signature.

Thus, by the means of the inventive system, the computation of the modular inverse is traded-off against one additional random or pseudo random number generation, two modular multiplications and the transmission of one number (of length of q, that is, typically 20 bytes).

In many modern portable devices such as PCMCIA cards or portable PC's, the communication or data takes negligible time when compared to the effort requested for computing modular inverses and therefore the inventive method offers advantageous trade-off possibilities versus prior state art.

Advantageous additional embodiments of the inventive system are resulting from the following respective dependent claims.

We claim:

1. A system, comprising, at least, two parts, connected to each other by the means of a common communication interface wherein a first communicating apparatus A, having data processing means, communication means, memory means and pseudorandom generation means relies on the computational power of a second communicating apparatus B having data processing means, communication means and memory means in order to compute the inverse of a first number x modulo a second number n, wherein n is a whole number greater than 1, and use the resulting modular inverse in one of an encryption, decryption, key exchange, identification and digital signature cryptographic protocol.

2. A system according to claim 1, wherein the computation of the modular inverse of the first number x is achieved by exchanging, at least, the following data between devices A and B:

a. Apparatus A generates by its random or pseudo-random generation means a number d, such that 1<d<n and sends, via the common communication interface, the, number y≡d x mod n to apparatus B, b. Apparatus B receives the number y, computes, by its data processing means, a number z such that z y≡1 mod n (that is, z is the inverse of y modulo n) and returns z to apparatus A via the common communication interface, c. Apparatus A computes, by its data processing means, a number w≡z d mod n and accepts w as the modular inverse of x only if x w{1 mod n, d. Apparatus A uses the number w as the modular inverse of x in one of an an encryption, decryption, key exchange, identification and digital signature cryptographic protocol.

3. A system according to claim 2 wherein k modular inverses are batched together at once by apparatus B, and wherein:

a. Apparatus A multiplies, by its data processing means, all the k numbers to be inverted $x_1, \ldots x_k$, wherein k is a whole number greater than 1, by each other to get a number x which it inverts;

b. Knowing $x_1, \ldots, x_k$ and the inverse of the product $$\pi_{i=1}^{k} x_i \bmod n,$$

apparatus A computes, by its data processing means, the modular inverses of numbers $x_1, \ldots, k_k$ by inter multiplications;

c. Apparatus A uses the so-computed modular inverses of $x_1, \ldots, x_k$ in one of an encryption, decryption, key exchange, identification and digital signature cryptographic protocol.

4. A system according to claim 1 wherein devices A and B execute a task requiring the revealing by apparatus A, of a number s which is the modular ratio of two quantities a and b (that is, $s = a/b$ rood n) wherein a and b are sensible information that should not be communicated in clear outside apparatus A wherein:

a. Apparatus A generates, by its pseudo-random generation means a number d, such that $1 < d < n$ and sends to the apparatus B the numbers $u = d\,a$ rood n and $v = d\,b$ rood n via the common communication interface;

b. Apparatus B computes, by its data processing means, the number s by $s = u/v \bmod n$, c. Apparatus B and/or apparatus A use the so-computed number s in one of an encryption, decryption, key exchange, identification and digital signature cryptographic protocol.

5. A system according to claim 4 wherein apparatus A is a DSA signing device wherein the following system parameters are set:

a. A prime modulus p where $2^{L-1} < p < 2^L$, where L is greater than 1;

b. A prime q such that $2^{\beta-1} < q < 2^{\beta}$, wherein $\beta$ is greater than 1 and wherein p-1 is a multiple of q;

c. A number g, of order q modulo p such that $$g = h^{\frac{p-1}{q}} \bmod p,$$

where h is any integer with $1 < h < p-1$ such that $$g = h^{\frac{p-1}{q}} \bmod p > 1;$$

d. A number x, generated pseudo randomly;

e. A number y defined by the relation: $y = g^x \bmod p$;

f. A number k generated pseudo randomly such that $0 < k < q$; and wherein apparatus A computes the digital signature of a message m (hashed value of a primitive message M) by conforming to the following rules:

g. An additional pseudo random number d such that $0 < d < q$ is generated by apparatus A; and h. The numbers $r = (g^k \bmod p) \bmod q$, $a = d\,(m + x\,r) \bmod q$ and $b = d\,k \bmod q$ are computed by apparatus A and sent to apparatus B, via the common communication interface for verification.

6. A system according to claim 5 wherein apparatus B is a DSA verifying device wherein which checks the validity of the signature $\{r, a, b\}$ by computing:

$$w = \frac{b}{a} \bmod q,$$

$u_1 = m\,w \bmod q$, $u_2 = r\,w \bmod q$, $v = (g^{u_1} y^{u_2} \bmod p) \bmod q$ and checking that v and r actually match.

7. A system according to claim 5 wherein device A is one of a smart-card, PCMCIA card, badge, contact-less card, and another portable device.

8. A system according to claim 7 wherein the communication between apparatus A and apparatus B is done by the means of the exchange of binary electronic signals.

9. A system comprising:

(A) a first communicating apparatus including
(1) a data processing device,
(2) at least one memory device,
(3) a communication device, and
(4) a pseudorandom generation device;

(B) a second communicating apparatus including
(1) a data processing device,
(2) at least one memory device, and
(3) a communication device linked to the communication device of said first apparatus; wherein said devices (1)–(4) of said first apparatus interact to form means, relying on the computational power of said second apparatus, for computing the inverse of a first number x modulo a second number n, wherein n is a whole number greater than 1, and for performing one of an encryption, decryption, key exchange, identification, and a signature cryptographic protocol using the computed modular inverse.

10. A system as defined in claim 9, wherein said first apparatus comprises one of a smart-card, a PCMCIA card, a badge, and a contactless card.

11. A system as defined by claim 9, wherein said second apparatus comprises one of a personal computer, a vending machine, and a physical access control gate.

12. A system as defined by claim 9, wherein said communication device of said first apparatus and said communication device of said second apparatus are part of a common communication interface providing two-way communication between said first and second apparatus.

13. A system as defined by claim 9, wherein said memory device of each of said apparatus comprises at least one of a RAM, a ROM, an EPROM and an EEPROM.

14. A system as defined by claim 9, wherein said data processing device of each of said apparatus comprises a CPU.

15. A system as defined by claim 14, wherein said CPU of said second apparatus is more powerful than said CPU of said first apparatus.

16. A method comprising:

(A) computing, via first and second communicating apparatus linked by a common communication interface, the inverse of a first number x modulo a second number n, wherein n is a whole number greater than 1, said first apparatus including (1) a data processing device and at least one memory device, and (3) a pseudorandom generation device, said second apparatus including a data processing device and at least one memory device; and (B) performing, in said first apparatus, one of an encryption, decryption, key exchange, identification, and a signature cryptographic protocol using the modular inverse computed in said step (A).

17. A method as defined by claim 16, wherein said step (A) comprises
   (1) generating, in the random or pseudorandom generation device of said first apparatus, a number d such that $1 < d < n$;
   (2) computing, via said first apparatus, a number $y = d\ x$ mod n, and sending said number y to said second apparatus via said common interface;
   (3) computing, via said data processing device of said second apparatus, a number z such that $z\ y = 1$ mod n, and returning said number z to said first apparatus via said common interface; and
   (4) computing, via said data processing device of said first apparatus, a number $w = z\ d$ mod n, and accepting w as the modular inverse of x only if $x\ w = 1$ mod n; and wherein said step (B) comprises using the number w as the inverse module of x in said protocol.

* * * * *